M. MARRONE.
CHOPPER AND DISINTEGRATOR.
APPLICATION FILED SEPT. 14, 1909.
995,545.
Patented June 20, 1911.
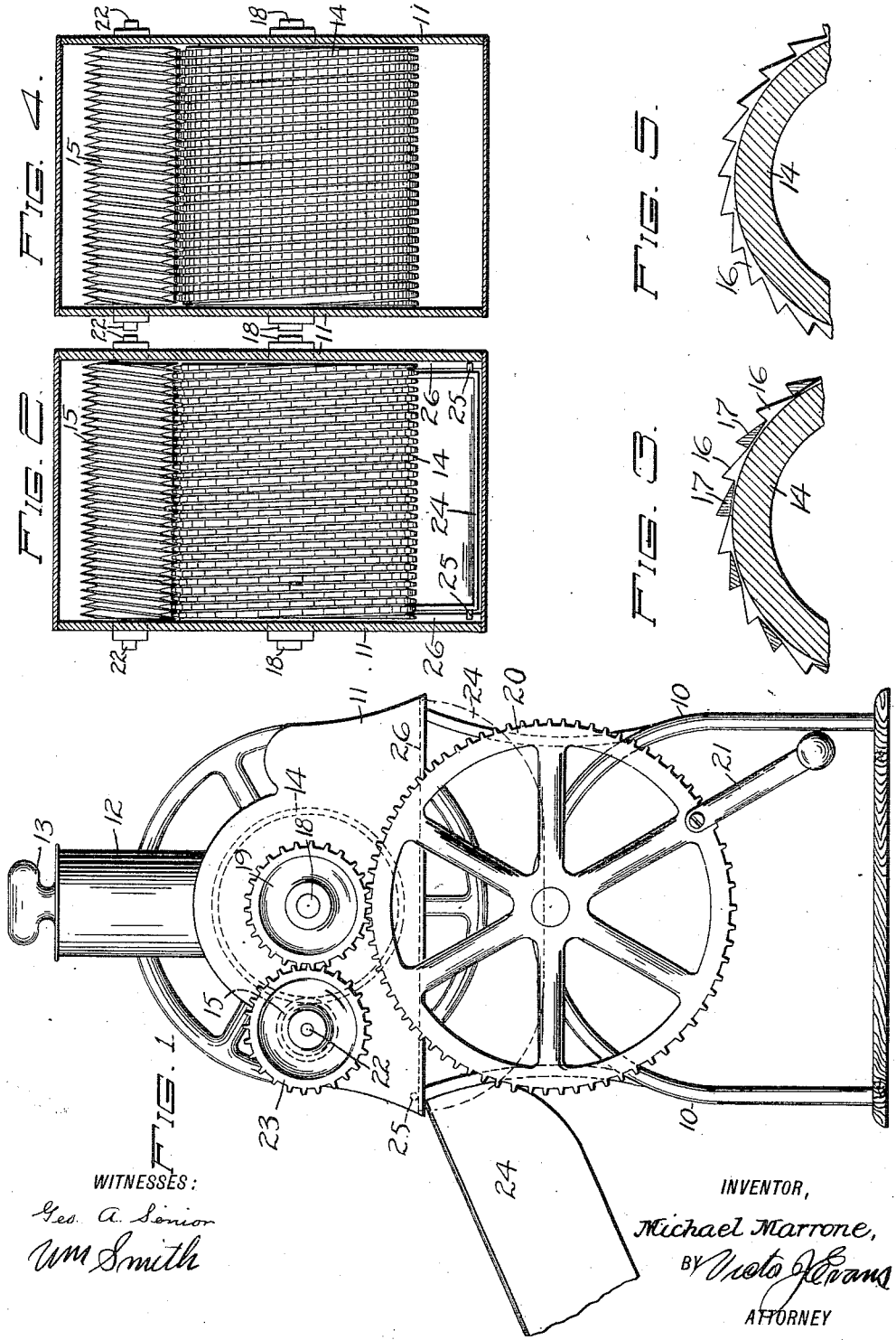
WITNESSES:
INVENTOR,
Michael Marrone,
BY
ATTORNEY

UNITED STATES PATENT OFFICE.

MICHAEL MARRONE, OF NEW YORK, N. Y., ASSIGNOR TO LUIGI FUCITO, OF NEW YORK, N. Y.

CHOPPER AND DISINTEGRATOR.

995,545.  Specification of Letters Patent.  Patented June 20, 1911.

Application filed September 14, 1909. Serial No. 517,622.

*To all whom it may concern:*

Be it known that I, MICHAEL MARRONE, a subject of the King of Italy, residing at New York, in the county of New York and State of New York, have invented new and useful Improvements in Choppers and Disintegrators, of which the following is a specification.

This invention relates to vegetable choppers and its object is to provide coöperating cutting cylinders which are adapted to cut across the grain of the vegetable so as to reduce it to small particles. This quality is highly essential in the operation of vegetable cutters as the tough texture of some vegetables is difficult to overcome by cutters and choppers which have been heretofore used. These and other details and objects of the device are more fully described in the following specification, set forth in the claims and illustrated in the drawings, where:

Figure 1 is a side elevation of the cutter. Fig. 2 is a horizontal, sectional view showing the cutting cylinders in plan. Fig. 3 is a detail sectional view of same. Fig. 4 is a plan view of a modified form of cutting cylinders. Fig. 5 is a sectional detail of same.

The device is mounted on legs or supports 10 of suitable design and strength and embraces a casing 11 having at its upper end, a hopper 12 containing a plunger or follower 13 which is placed on the vegetable that is contained in the hopper in order to press it downward so that it may be disintegrated or chopped. In the sides of the casing 11 are journaled the cylinder 14 and the roller 15, the latter having a continuous spiral cutting blade while the former has on its outer surface a series of cutting teeth arranged in the spiral lines so as to form a continuous line of teeth. Within the groove between the teeth on the cylinder, the cutting blade of the roller is adapted to mesh. The distance between the teeth of the cylinder and the convolutions of the blade being identical so that they readily work together. As will be seen in Fig. 3, the cutting teeth 16 alternate with the adjacent teeth 17 of the rows on each side and these teeth are practically saw teeth, being beveled or chisel shaped at that cutting edge. As shown in Figs. 4 and 5, it is not essential that these teeth should be staggered or alternated where it is necessary to cut to a finer degree, in which case the teeth follow one another. In the manufacture of these cylinders, a spiral groove is formed on the surface of the cylinder and from the ridges formed by these grooves, the cutting teeth are produced and when it is necessary to sharpen same, the outer surface of the cylinder may be subjected to the action of an emery wheel or grind stone.

The outer end of the cylinder shaft 18 is provided with a pinion 19 which meshes with and is driven by a gear wheel 20 journaled in the frame 10 and may be there provided with a handle 21 or a pulley to drive same by power. The shaft 22 of the roller carries a pinion 23 to mesh with the pinion 19 so that the roller is rotated. It is obvious that the sizes of these pinions may vary in order to change the speeds of the cylinder and roller if desired.

In operation, the vegetable is placed in the hopper 12 and pressed downward by the follower subjecting it to the teeth of the cutting cylinder which cuts across its lower surface spirally or on diagonal lines thus preventing the vegetable from being disintegrated in shreds but in crisp particles which are further subjected to the spiral knife of the roller 15 and pass through the spaces between the roller and cylinder and into a box 24 which is suspended from studs 25 which are supported on flanges 26 at the bottom of the casing 11.

What I claim as new and desire to secure by Letters Patent is:

1. In a chopper and disintegrator, a cylinder having a continuous spiral groove forming a corresponding ridge, said ridge being transversely notched to produce cutting teeth, in combination with a second cylinder having a spirally disposed cutting blade engaging the spiral groove of the first cylinder, and supporting and driving means for the two cylinders.

2. In a chopper and disintegrator, a cylinder having a continuous spiral groove forming a corresponding ridge, said ridge being intersected by grooves formed parallel to the axis of the cylinder longitudinally of the latter to produce cutting teeth, in combination with a second cylinder having a spirally disposed cutting blade engaging the spiral groove of the first cylinder, and supporting and driving means for the two cylinders.

In testimony whereof I affix my signature in presence of two witnesses.

MICHAEL MARRONE.

Witnesses:
    JAMES F. DUHAMEL,
    MORRIS FLOREA.

---

Copies of this patent may be obtained for five cents each, by addressing the "Commissioner of Patents, Washington, D. C."